United States Patent [19]

Milenius

[11] 4,169,869

[45] Oct. 2, 1979

[54] LOW GLOSS ABS EXTRUSION COMPOSITIONS

[75] Inventor: David L. Milenius, Rocky River, Ohio

[73] Assignee: Abtec Chemical Company, Louisville, Ky.

[21] Appl. No.: 848,189

[22] Filed: Nov. 3, 1977

[51] Int. Cl.² .................. C08L 51/00; C08L 55/02
[52] U.S. Cl. ........................................... 525/87
[58] Field of Search ............................ 260/876 R

[56] References Cited

U.S. PATENT DOCUMENTS

| | | | |
|---|---|---|---|
| 2,802,808 | 8/1957 | Hayes | 260/876 R |
| 3,118,854 | 1/1964 | Hess, Jr. et al. | 260/876 R |

*Primary Examiner*—J. Ziegler
*Attorney, Agent, or Firm*—J. Hughes Powell, Jr.

[57] ABSTRACT

ABS compounds which provide extruded articles, having a low gloss or mat finish and which retain excellent impact resistance are obtained by including in said ABS compositions poly(butadiene) and a copolymer of butadiene and acrylonitrile.

5 Claims, No Drawings

LOW GLOSS ABS EXTRUSION COMPOSITIONS

BACKGROUND OF THE INVENTION

ABS compounds are well known molding and extrusion materials, and such compounds find a great variety of uses in tough molded articles such as luggage, protective covers, exterior and interior automobile parts, and the like. Such applications require a low gloss or mat surface. Improved compositions, which when extruded into articles, have low gloss but retain good impact resistance are desired.

SUMMARY OF THE INVENTION

Improved low gloss ABS extrusion compositions which retain good impact resistance after extrusion are obtained when such compounds include a poly(butadiene-1,3) and a copolymer of butadiene-1,3 and acrylonitrile.

DETAILED DESCRIPTION

ABS plastics are well known extrusion and molding resins. Such resins are generally referred to as graft copolymers. Typical preparations are described, for example, in U.S. Pat. Nos. 3,328,275; 2,948,703; 2,820,773; 3,222,422; 2,908,661; 2,802,808; 3,074,906; 3,010,936; and 3,168,593. The resins are readily obtained by polymerizing styrene and acrylonitrile in the presence of a conjugated diene polymer, usually polybutadiene. The ABS polymers are generally a mixture of rubber particles dispersed in a styrene-acrylonitrile matrix, at least a part of the styrene and acrylonitrile usually being grafted onto the elastomeric polybutadiene backbone. These graft polymers, as is fully described in the literature, are prepared from mixtures of vinyl cyanides as acrylonitrile and methacrylonitrile and vinyl aromatic compounds as styrene, methyl styrene, vinyl toluene and the like, with a conjugated diolefin polymer latex as polybutadiene, or elastomeric butadiene copolymers of butadiene-styrene, butadiene-acrylonitrile, butadiene-alkyl acrylates, and the like. Alkyl methacrylates as methyl methacrylate may be used in addition to, or in place of, acrylonitrile and styrene if desired.

Proportions of monomers normally used are about 40 to 90% of combined nitrile and vinyl aromatic with about 60 to 10 parts of diene elastomer. The acrylonitrile preferably is from about 10 to 60% by weight. Blends of ABS resins with other polymers as vinyl chloride polymers, styrene polymers, methyl methacrylate polymers, polyurethanes, polycarbonates, and the like may also be used. Any ABS compound that may be extruded or molded may be used in accordance with this invention.

The poly(butadiene-1,3) employed is an elastomer and may be prepared in a variety of ways including emulsion, suspension, solution, bulk and the like, by a standard free radical catalyst or the so-called Ziegler catalysts, as is well known by those skilled in the art. The poly(butadiene), so long as it is an elastomer, may be cis-poly(butadiene) which contains substantially all cis structures, or it may be emulsion polymerized poly(butadiene) containing a mixture of cis and trans structures. The poly(butadiene) preferably has a 4 minute, 212° F. Mooney value range of about 15 to 200, large rotor.

The copolymer of butadiene-1,3 and acrylonitrile used in conjunction with the poly (butadiene) will normally contain less than about 30 weight percent acrylonitrile, more preferably, about a10 to 25 weight percent acrylonitrile. Small amounts of other vinylidene monomers containing a terminal $CH_2<$ group may be included, but the major components of such copolymers normally are butadiene-1,3 and acrylonitrile. These copolymers also may be made by a number of different procedures, in suspension, emulsion, solution, bulk and the like by methods well known by those skilled in the art, so long as the copolymer is an elastomer and has a Mooney range of about 15 to 200, large rotor, it will be satisfactory for the purposes of this invention.

The amount of poly(butadiene) and copolymer of butadiene and acrylonitrile will be from about 4 to 12 total weight parts per 100 weight parts of ABS. The mixture must contain greater than 0.5 weight part of poly(butadiene) and the range of poly(butadiene) will be from about 11.5 to 0.5 weight parts, and the amount of copolymer of butadiene and acrylonitrile will range from 0.5 to 11.5 weight parts, per 100 weight parts of ABS. A useful range has been found to be about 4 to 7 weight parts poly(butadiene) with about 0.5 to 3 weight parts of the copolymer of butadiene and acrylonitrile.

In addition to the butadiene rubber, the ABS compounds may contain any of the other compounding ingredients used by and known by those skilled in the art to provide useful extrusion and molding ABS compounds. Such additives include, for example, other polymers and resins, stabilizers, anti-oxidants, coloring agents, fillers, reinforcing agents, processing aids, and the like. These and other ingredients may be mixed with the ABS materials by any of the standard compounding techniques. The polymers may be mixed together in any combination and order in the dry or wet, or latex, state. One convenient method is to mix the compounding ingredients in an internal mixer and extrude in the form of pellets, for example, about $\frac{1}{8}''\times\frac{1}{8}''$ size for ease of later injection or other molding or articles.

EXAMPLE I

A sheet compound was prepared by mixing 0 to 7 weight parts of poly(butadiene-1,3) having a 4 minute Mooney value of 100 ML at 212° F. large rotor, 0 to 3.5 weight parts of a copolymer of butadiene and acrylonitrile containing 22% acrylonitrile and having a Mooney value of 80 ML, with 100 weight parts of a standard graft ABS compound containing 37% butadiene, 51% styrene and 22% acrylonitrile, one weight part stearamide lubricant. This compound was formed into a $\frac{1}{8}''$ sheet. The improved impact and decreased gloss resulting from the various ratios and mixtures is set forth in the data table below. All parts are weight parts.

TABLE I

| Poly-(butadiene) | Butadiene/ Acrylonitrile Copolymer | Drop Impact - ft. lb. | | | 60° Gloss |
|---|---|---|---|---|---|
| | | 73° F. | −20° F. | −40° F. | |
| 0 | 0 | 23 | 13 | — | 90 |
| 7 | 0 | 9 | — | 3 | 13 |
| 3.5 | 3.5 | 26 | — | 21 | 29 |
| 5.5 | 1.5 | 26 | 20 | — | 30 |

The sheet compositions containing 3.5 to 5.5 weight parts of polybutadiene and 1.5 to 3.5 weight parts of the copolymer of butadiene and acrylonitrile had improved drop impact at 73° F. and 20° F., and much lower gloss than the ABS compound not containing these two elastomers. This extruded sheet material has an excellent mat surface and good mechanical properties.

EXAMPLE II

In another demonstration of the improved mat surface of ABS compositions prepared in accordance with this invention; polybutadiene and a copolymer of butadiene/acrylonitrile containing 22% acrylonitrile were added to an ABS compound as described in amount of 7 weight parts for comparison to an ABS compound containing no added elastomers, and a compound in accordance with this invention containing 3.5 weight parts each of the polybutadiene and the copolymer of butadiene and acrylonitrile. Each composition also contained 1 weight part stearamide lubricant. Test data showing the effect of Izod impact (ASTM D256) of ⅛" thick injection molded bars and drop impact (ASTM 3029 Proc. B) on an extruded sheet on specimens ⅛" thick are set forth below. The extruded articles had low gloss and an excellent mat surface in addition to improved Izod impact when the blend of elastomers was used.

TABLE II

| Additives | Izod (ft. lb./in.) 73° F. | −40° F. | Drop Weight (ft. lb.) 73° F. | −40° F. |
|---|---|---|---|---|
| None | 6.8 | 1.0 | 26 | 16 |
| Poly(butadiene) | 7.8 | 1.3 | 8 | 3 |
| Copolymer | 9.6 | 1.2 | 14 | N.A. |
| Polybutadiene/ copolymer | 11.7 | 2.5 | 25 | 20 |

I claim:

1. A solid thermoplastic composition comprising
   (1) an ABS graft copolymer of acrylonitrile, butadiene and styrene, comprising from about 40 to 90 weight percent combined acrylonitrile and styrene, said styrene being present in amount from about 30 to 80 weight percent, said acrylonitrile being present in amount from about 10 to about 40 weight percent and said butadiene being present in amount from about 10 to 60 weight percent, and additionally about 4 to 12 total weight parts per 100 weight parts of
   (2) at least about 0.5 weight parts of added poly(butadiene-1,3) and
   (3) at least 0.5 weight parts of a copolymer of butadiene and acrylonitrile containing less than 30 weight percent acrylonitrile.
2. A composition of claim 1 wherein said poly(butadiene) is present in amount from about 4 to 7 weight parts and said copolymer of butadiene-acrylonitrile is present in amount of about 0.5 to 3 weight parts.
3. A composition of claim 1 wherein there is 20 to 30 weight percent styrene, 50 to 60 weight percent acrylonitrile and 15 to 30 weight percent butadiene polymerized in said ABS resin.
4. A composition of claim 3 wherein the copolymer of butadiene and acrylonitrile contains about 10 to 25 weight percent acrylonitrile.
5. A composition of claim 4 wherein the ABS contains about 15 to 30 weight percent polybutadiene and 70 to 85 weight percent styrene and acrylonitrile.

* * * * *